United States Patent [19]
Ho

[11] Patent Number: 5,884,302
[45] Date of Patent: Mar. 16, 1999

[54] SYSTEM AND METHOD TO ANSWER A QUESTION

[76] Inventor: Chi Fai Ho, 4816 Cabello Ct., Union City, Calif. 94587

[21] Appl. No.: 786,109

[22] Filed: Jan. 17, 1997

Related U.S. Application Data

[63] Continuation-in-part of Ser. No. 758,896, Dec. 2, 1996, Pat. No. 5,836,771.
[51] Int. Cl.$^6$ ..................................................... G06F 17/30
[52] U.S. Cl. ........................... 707/3; 704/2; 704/3; 704/9
[58] Field of Search ........................ 707/1–10, 100–104, 707/200–206; 704/1, 8, 9, 260, 2, 3

[56] References Cited

U.S. PATENT DOCUMENTS

| | | | |
|---|---|---|---|
| 5,519,608 | 5/1996 | Kupiec | 704/9 |
| 5,652,828 | 7/1997 | Silverman | 704/260 |
| 5,677,835 | 10/1997 | Carbonell et al. | 704/8 |
| 5,732,395 | 3/1998 | Silverman | 704/260 |
| 5,749,071 | 5/1998 | Silverman | 704/260 |
| 5,751,906 | 5/1998 | Silverman | 1/1 |

*Primary Examiner*—Thomas G. Black
*Assistant Examiner*—Ruay Lian Ho
*Attorney, Agent, or Firm*—Peter P. Tong

[57] ABSTRACT

A database-processing method and system for answering a natural-language question by a computer system with a database. In one embodiment, the system analyzes the grammatical structure of the question. In the analysis, the system scans the question to extract each word in the question; then based on a pre-defined context-free grammatical structure, the question is parsed into its grammatical components using one or more grammatically rules and the database. After parsing the question, the system transforms the components into one or more instructions, using one or more semantic rules and the database. The instructions, when executed, at least access data from the database for generating the answer to the natural-language question. In another embodiment, the system compares the natural-language question with questions stored in the database; each question in the database has its corresponding answer. If there is a match, the system retrieves the answer to the corresponding matched question and presents the answer to the student.

25 Claims, 12 Drawing Sheets

SYSTEM AND METHOD TO ANSWER A QUESTION

This is a continuation-in-part of application, titled, "A Learning Method and System Based on Questioning," and filed on Dec. 2, 1996, U.S. patent application Ser. No. 08/758,896, U.S. Pat. No. 5,836,771.

BACKGROUND

The present invention relates generally to answering a question, and more particularly to answering a question by a computer using a database.

In the information age, those who have more information typically believe they have a competitive advantage. Actually, they are only partially correct. Not only do they need to have more information, the information has to be easily accessible and processable.

For decades, computer programmers have processed information in a database with programming languages. Though most people prefer to process information using a natural language, which is a language we use everyday, scientists still have not developed an effective way to search databases using a natural language.

When a manager wants information stored in a large database, he may not be able to retrieve it unless he knows specific programming techniques. So the manager may ask one or more programmers to write a program to search the database. The programmers serve as the "middle men" between the manager and the database. With the middle men involved, sometimes the manager might have to wait for a week before he gets his answer. The lack of an immediate response to his question hinders the manager's progress.

To access information directly from a large database, a programmer typically uses a programming language, such as SQL, which is a special language to query or to search for information in a database. A query may contain more than one SQL statement. Each query, when executed, searches the database for the requested information.

But languages such as SQL have some drawbacks. SQL is designed for retrieving information, and not for analyzing them. For example, it is difficult to use SQL to generate the answer to the question, "Who is the first President of the United States?" To answer this question, the computer not only has to retrieve information on all the US Presidents, the computer also has to determine among the retrieved information the first President who was inaugurated.

Many researchers have been working on ways to search a database using a natural language. They want to create the type of user-friendly technology shown in some television shows, where the captain of a space ship can get an answer or a task performed by asking a computer a natural language question. The captain can simply ask: "COMPUTER, chart the course away from the Klingons to the galaxy system Inner Nepula Two;" and the computer automatically performs the task. However, in real life, communicating with a computer using a natural language is an extremely complicated task. One reason is that practically every language has many exceptions to a set of basic rules. Actually, in many instances, the computer cannot understand its task because of those exceptions and permutations among the exceptions.

Thus, we still need a method and a system to access information from a database without requiring a user to use a programming language.

SUMMARY

The present invention is a computer-aided method and system to access and process information from a database using a natural-language question. Based on the present invention, a user can search the database using a natural language, and does not have to rely on programming languages.

In one embodiment the natural-language question is a grammatically-context-free question, which means that the grammatical meaning of each word in the question does not depend on any other words in the question.

The invented system analyzes the grammatical structure of the natural-language question for parsing it into its grammatical components based on a pre-defined context-free grammatical structure. This task uses one or more grammatical rules and a grammatical table in the database.

Then the system transforms at least one component into one or more instructions. This task depends on one or more semantic rules together with semantic tables in the database.

In another embodiment, the invented system further executes the generated instructions to access data from one or more topic-related tables, and processes those information for generating an answer to the natural-language question.

Thus, the user can enter his question using a natural language, not programming languages, and the invention transforms the question into computer executable instructions.

The natural language question received may be ambiguous. In one embodiment, the question contains a word with more than one grammatical meaning. The system can produce an answer for each meaning and ignores those meanings with no answer, or the system can ask the user the desired grammatical meaning.

In another embodiment, if the question contains one or more words not in the grammatical table, the system drops the un-recognized words and processes the remaining question; or the system asks the user to change the words. The system can also match the unrecognized word with the word most similar to it in the grammatical table, and present that most similar word to the user for approval.

In yet another embodiment, though all the words in the question can be found in the grammatical table, the grammatical structure of the question is different from the pre-defined context-free grammatical structure. The pre-defined structure has essential and non-essential grammatical components. If a non-essential grammatical component is missing in the question, the system ignores it to generate an answer to the question. Another way to resolve the problem is to ask the user to re-enter the question using the pre-defined grammatical structure. A further way is to identify the nouns and the non-auxiliary verbs, if any, in the question. Then the system suggests the user to rephrase the original question, retaining the identified words, and using the pre-defined structure.

In a further embodiment, the database includes a questions table, which has many questions, each with its corresponding answer. The system compares the natural-language question with the questions in the table. If there is a match, the system retrieves the answer to the corresponding matched question and presents the answer to the student.

Other aspects and advantages of the present invention will become apparent from the following detailed description, which, when taken in conjunction with the accompanying drawings, illustrates by way of example the principles of the invention.

Same numerals in FIGS. 1–10 are assigned to similar elements in all the figures. Embodiments of the invention are discussed below with reference to FIGS. 1–10. However, those skilled in the art will readily appreciate that the detailed description given herein with respect to these figures is for explanatory purposes as the invention extends beyond these limited embodiments.

DETAILED DESCRIPTION

Figure 1:
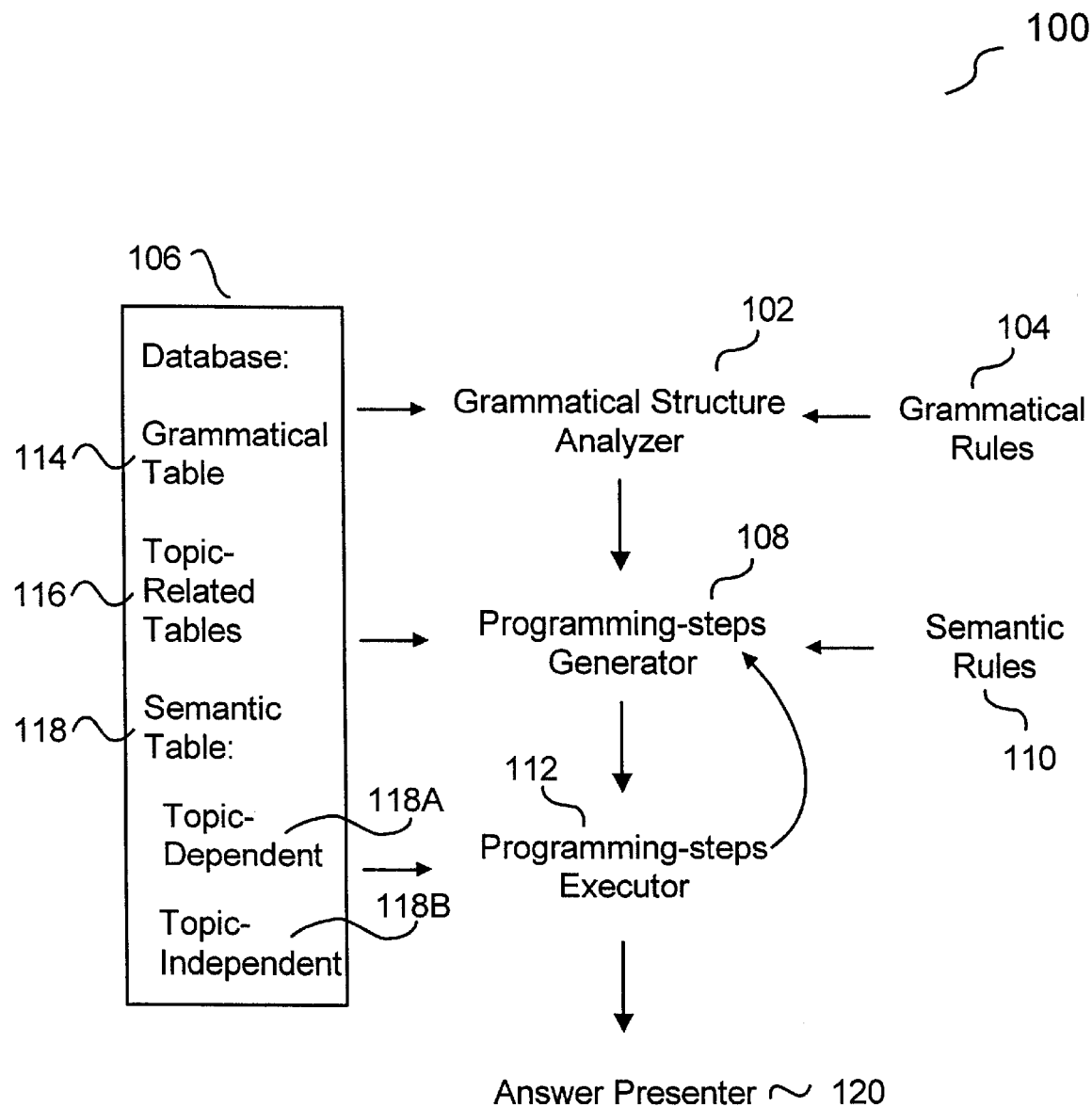
FIG. 1 shows one embodiment of the present invention.

FIG. 1 shows one embodiment 100 including a number of elements in the present invention. An input device, such as a keyboard, a mouse or a voice recognition system, receives a natural-language question. Then a grammatical structure analyzer 102 analyzes the grammatical structure of the question for parsing the question into its grammatical components based on a pre-defined context-free grammatical structure. The analyzer 102 performs its tasks using a set of grammatical rules 104, and data from a database 106. Then a programming-steps generator 108 automatically generates one or more instructions based on the components. The generator 108 performs its tasks using a set of semantic rules 110 and data from the database 106. The instructions flow to a programming-steps executor 112, which executes the instructions. More than one set of instructions might be generated and executed. In at least one set of instructions, when it is executed, it queries and processes data from the database 106 for generating an answer to the question. An answer presenter 120, which is an output device, such as a monitor, a printer or a voice synthesizer, presents the answer to a user of the system.

Figure 2A:
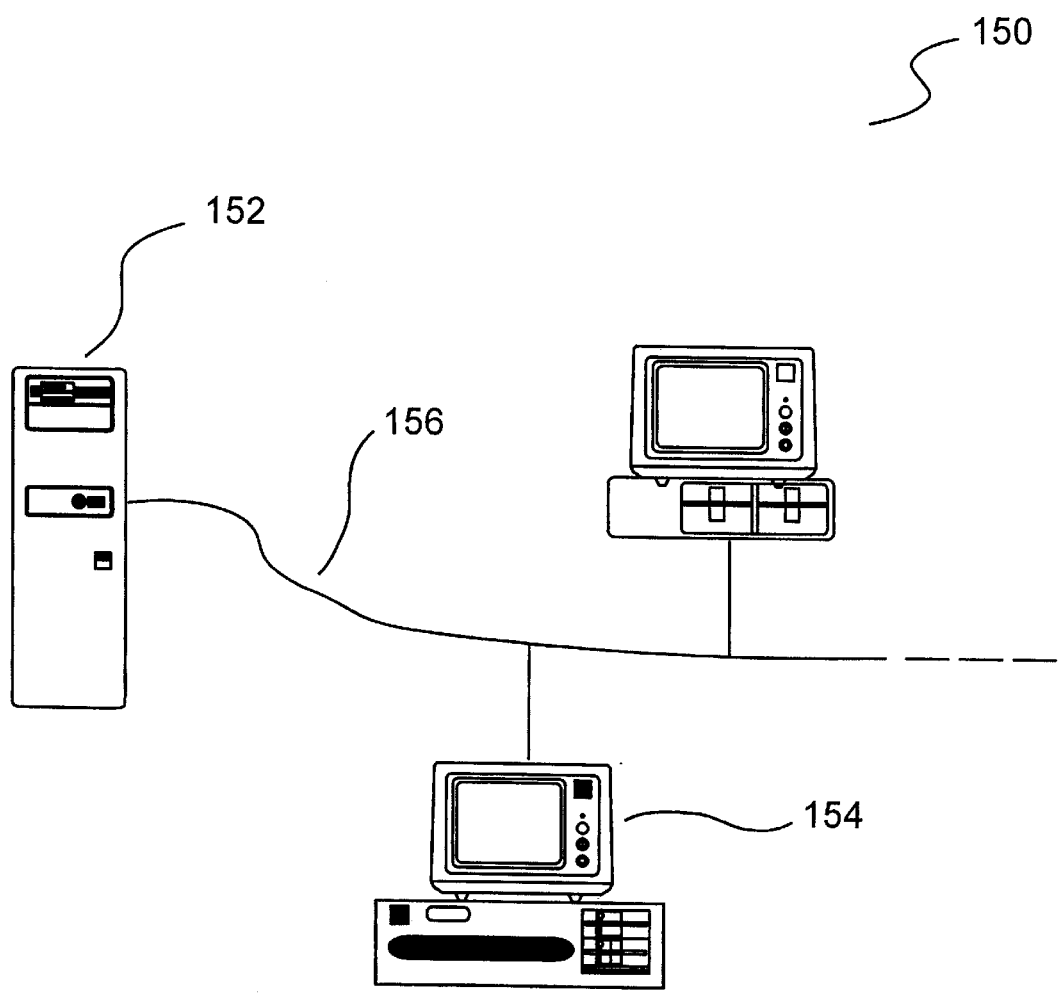
FIGS. 2A–B show physical elements implementing one embodiment of the present invention.

FIG. 2A shows one physical embodiment 150 implementing the present invention, preferably in software and hardware. The embodiment 150 includes a server computer 152 and a number of client computers, such as 154, which can be a personal computer. Each client computer communicates to the server computer 152 through a dedicated communication link, or a computer network 156.

Figure 2B:
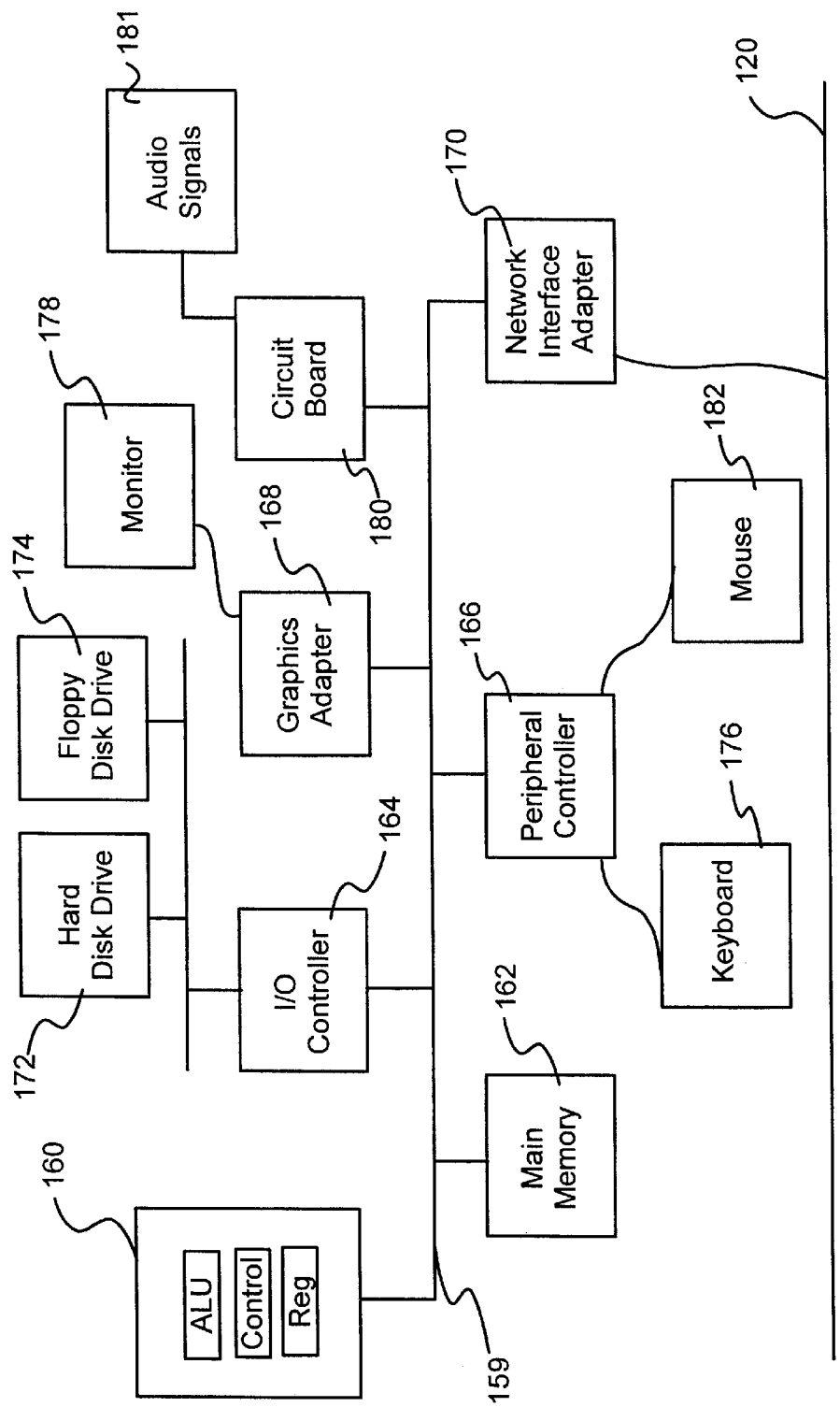

FIG. 2B shows one embodiment of a client computer 154. It typically includes a bus 159 connecting a number of components, such as a processing unit 160, a main memory 162, an I/O controller 164, a peripheral controller 166, a graphics adapter 168, a circuit board 180 and a network interface adapter 170. The I/O controller 164 is connected to components, such as a harddisk drive 172 and a floppy disk drive 174. The peripheral controller 166 can be connected to one or more peripheral components, such as a keyboard 176 and a mouse 182. The graphics adapter 168 can be connected to a monitor 178. The circuit board 180 can be coupled to audio signals 181; and the network interface adapter 170 can be connected to the network 120, which can be the Internet, an intranet, the Web or other forms of networks. The processing unit 160 can be an application specific chip.

Different elements in the present invention may be in different physical components. For example, the grammatical structure analyzer 102 and the grammatical rules may be in a client computer; and the database 106, the programming-steps generator 108 and the program executor 112 may reside in a server computer. In another embodiment, the database is in the server computer, and the grammatical structure analyzer 102, the programming-steps generator 108, the program executor 112 and the rules reside in a client computer. Yet in another embodiment, the embodiment 100 is in a client computer.

In the present invention, a question is defined as an inquiry demanding an answer; and an answer is defined as a statement satisfying the inquiry. Also, a grammatical component is a component with one or more grammatical meanings, which are defined by a set of grammatical rules to be explained below. For example, the word "president" is a noun, which has a grammatical meaning. So the word "president" is a grammatical component.

A natural-language question means a question used in our everyday language. The language can be in English or other languages, such as French. Examples of natural-language questions are:

Who is the first President?

What are the Bills of Right?

Where is the capital of Texas?

What is the immediate cause to the Civil War?

Why did President Nixon resign?

Who is the third President?

Who is the President after John Kennedy?

When did President Lyndon Johnson die?

When was President Nixon born?

What is the derivative of sin(x+4) with respect to x?

Why is delta used in step 4 of the proof?

A statement that is not based on a natural language is a statement that is not commonly used in our everyday language. Examples are:

For Key in Key-Of(Table) do

Do while x>2

A grammatically-context-free question is a question whose grammar does not depend on the context. Each word in the question has its own grammatical meaning, and does not need other words to define its grammatical meaning. Hence, the grammatical structure of the question does not depend on its context. Note that "a word" can include "a number of contiguous words." This is for situations where a term includes more than one word but has only one grammatical meaning, such as the preposition "with respect to."

The present invention includes a database, which can be a relational database, an object database or other forms of database. The database can reside in a storage medium in a client computer, or a server computer, or with part of it in the client computer and another part in the server computer.

In one embodiment, the database includes a number of tables. A table can be treated as a set of information or data grouped together that have some common characteristics. The data in each table can be further divided into different areas, and each area is represented by an attribute, which is equivalent to an identifier for a group of data that are more narrowly focused than all the data in a table. In the present invention, tables and attributes have similar function, except a table may be considered to have a broader coverage, and an attribute a narrower focus. In some examples, a table has two dimensions, as will be explained below.

Some values or data in the database may be unique. For example, if a value is a person's social security number, that value is unique. Such values are known as key values, and their corresponding attributes are known as key attributes. Note that a table can have one or more key attributes, and a key attribute may in turn be formed by more than one attribute.

One embodiment of the database 106 includes a grammatical table 114, one or more topic-related tables 116, and two semantic tables, 118A and 118B. In a general sense, the grammatical table 114 determines the grammatical meaning of each word in the question, such as whether a word is a noun or a verb. Each topic-related table 116 groups data related to a topic together in a specific format. Separated into a topic-dependent semantic table 118A and a topic-independent semantic table 118B, the semantic tables define the semantic meaning of each word, such as whether a word refers to an algorithm or data in a topic-related table.

The grammatical table 114 defines the grammatical meanings of words used in the natural-language question. If questions entered into the system is limited to only one subject, such as history, the grammatical table will include words in that subject, and words commonly used by a user of the system in asking questions. Each word in the table may be defined in the following format:

```
CREATE TABLE Grammatical (
    word                  Character string NOT NULL, // the word
    grammatical-meaning   Character string NOT NULL, //e.g. "Examiner"
                          // has "noun" as its grammatical meaning
)
```

Each topic-related table combines data related to a topic in a specific format. As an example, one table includes all the data related to the Presidents of the United States, and another includes all the data related to the First Ladies of the United States. The table may be two-dimensional, and include a number of columns and rows. All the data in a column or a row typically have one or more common characteristics. For example, one row includes data that identify all the bills passed by the Presidents. For a two-dimensional table, data in a row can have one characteristic, and data in a column can have another characteristic. For example, data in one column identify the heights of the Presidents, and data in a row identify data related to one specific President; the following describes an example of data along the row:

```
CREATE TABLE PRESIDENT AS (
    //Table of all U.S. Presidents & Vice Presidents
    Name  Character string KEY, // President Name--a key attribute
        Position     Character string,   //President, Vice President
        Start_Year   Integer,            //First Year of Presidency
        End_Year     Integer,            //Last Year of Presidency
```

-continued

```
        Born_Date    Date,               //Date of Birth
        Death_Date   Date,               //Date of death
)
``` le;2qThere is also a table-structure dictionary, which defines how the topic-related tables arrange their data. This dictionary is typically not considered as a part of the database. It does not contain topic-related data, but it contains structures of the topic-related tables in the database. Many database management systems automatically generate the table-structure dictionary based on the programming statements defining the topic-related tables, such as the CREATE clauses in SQL-like languages. As an example, the table-structure dictionary defines the structure of the data in the above President table by indicating that the first entry represents the name of the president, the second the position, and so on. Thus, the dictionary can contain the name of the table (the table name), the name of the table's attributes (attribute names), and their corresponding data types.

A word in the question may need one or both of the semantic tables. The topic-independent semantic table 118B defines whether a word stands for an algorithm or data in a topic-related table. Such a table may be defined as follows:

```
CREATE TABLE Topic_Independent_Semantic (
    word   NOT NULL,  // the word
    semantics,        // Indicates if the word refers to data in a
                      // topic-related table, an algorithm etc. If the
                      // word is mapped to an algorithm, that
```

-continued

```
                      // algorithm will also be identified, as will be
                      // further explained below.
    synonym,          // A word might have synonyms, as will be
                      // further explained below.
)
```

Words with similar meaning are grouped together and are represented by one of those words as the synonym for that group of words. If a word does not have other words with similar meaning, the synonym is the word itself.

Many words do not point to an algorithm. They correspond to data in topic-related tables. The topic-dependent semantic table 118A identifies the semantic meaning of those words through matching them to data in topic-related tables. For example, the adjective "first" applying to the President's table may operate on the data under the inauguration date attribute; on the other hand, the adjective "first" applying to the First Ladies' table may operate on the data under the date of death attribute. Such a topic-dependent table 118A may be defined as follows:

```
CREATE TABLE Topic_Dependent_Semantic (
    Table_Name NOT NULL,     // For a table with the name Table_Name:
        Who_Attribute,       // The attribute associated with 'who'
        When_Attribute,      // The attribute name associated with 'when'
        {i-pronoun}_Attribute, // The attribute associated with the
                             // {i-pronoun}. The symbols { } denote the
                             // word it contains. Here, the word is
                             // an i-pronoun.
    ...
    {Adj }_Attribute,
        // The attribute associated with the adjective {adj }. In this
        // example, the word is an adjective.
    {Noun}_Attribute,
        // Attribute name associated with the noun {noun}. Certain
        // nouns may refer instead to an algorithm, such as "sum."
)
```

In one embodiment, the grammatical analyzer 102, the grammatical rules 104 and the grammatical table 114 are in a client computer. The programming-steps generator 108, the semantic rules 110, the semantic tables 118 and the table-structure dictionary are in a middleware apparatus, which can be a Web server. The programming-steps executor 112 with the topic-related tables are in a back-end server, which can be a database server.

One embodiment includes a computer-readable medium that encodes with a data structure including the semantic tables 118. Another embodiment includes a computer-readable medium that encodes with a data structure including the semantic tables 118 and topic-related tables 116. Yet another embodiment includes a computer-readable medium that encodes with a data structure including the semantic tables 118 and the grammatical table 114.

Yet a further embodiment includes a computer-readable medium that encodes with a data structure including the grammatical table 114, the topic-related tables 116 and the semantic tables 118.

Figure 3:
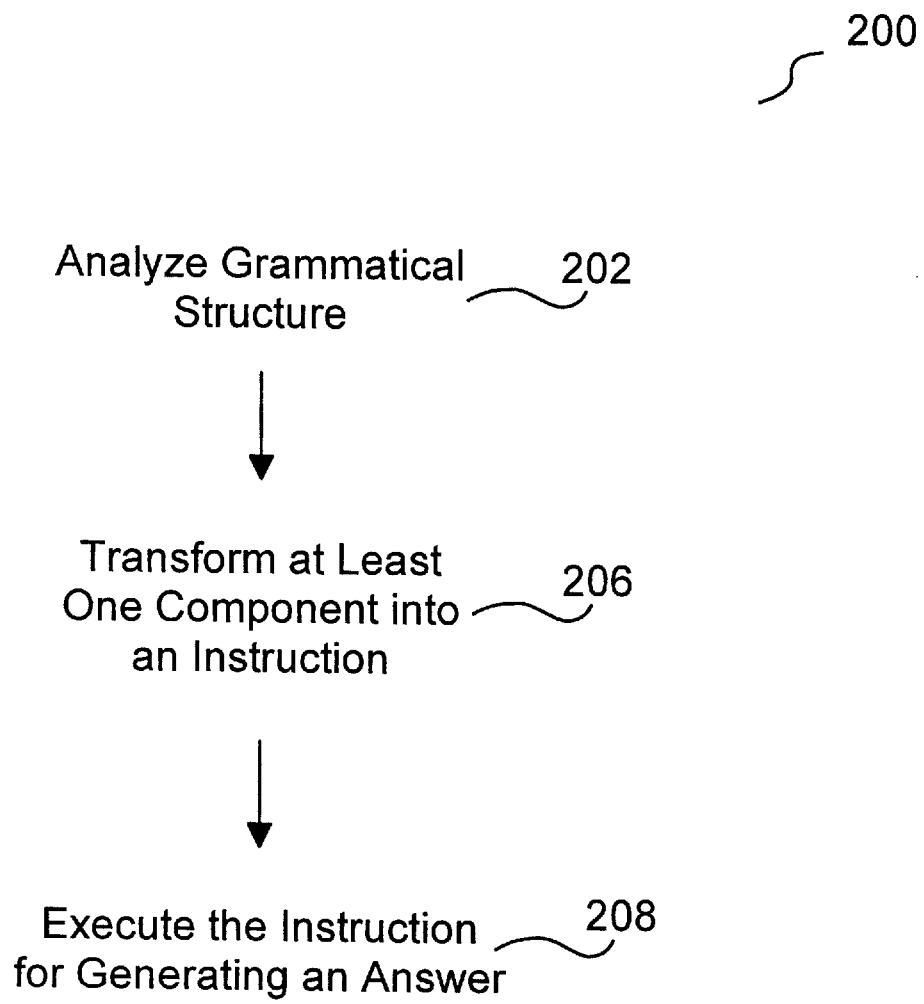
FIG. 3 shows a set of steps to be used by the embodiment shown in FIG. 1.

FIG. 3 shows a set 200 of steps to implement one embodiment of the present invention. A natural-language question is entered into the system 100. The system analyzes (Step 202) the grammatical structure of the question so as to parse it into its grammatical components, based on a pre-defined context-free grammatical structure. This task uses a set of grammatical rules 104 and the grammatical table 114. Then, the system transforms (Step 206) at least one component into one or more instructions using a set of semantic rules 110 with one or both of the semantic tables 118. Then, the one or more steps are executed (Step 208) to access and process data from one or more topic-related tables so as to generate an answer to the question.

In another embodiment, the programming-steps generator 108 transforms all the grammatical components of the question into instructions using semantic rules 110 with one or both of the semantic tables. Then the executor 112 executes all the steps to access and process data from one or more topic-related tables for generating an answer to the question.

Grammatical Structure Analyzer

In one embodiment, the analyzer 102 scans the question to extract each word in the question. Then the analyzer 102 maps each extracted word to the grammatical table 114 for identifying its grammatical meaning. For example, the word "Clinton" is identified by the grammatical table to be a proper noun; and the word "sum" is a noun. After establishing the grammatical meaning of each word, the analyzer 102 uses a set of grammatical rules to establish the grammatical components of the question based on the pre-defined context-free grammatical structure.

For a number of words, their grammatical meanings depend on their adjacent words. In one embodiment, the analyzer 102 combines each word with its contiguous words to determine its grammatical component. For example, if the word is "with," in analyzing its grammatical meaning, the analyzer 102 identifies its contiguous words. If its contiguous words are "respect to," then the three words are combined together and are considered as one preposition. Thus, to determine grammatical meaning of a word, the analyzer identifies that word, and then a number of words following it, such as two words following it. The analyzer 102 analyzes the identified words as a unit. If the analyzer 102 cannot identify the grammatical meaning of that sequence of words, the analyzer 102 removes the last word from the sequence, and analyzes them again. The process repeats until either a grammatical meaning is found, or there is no more word. Any time when the analyzer 106 has identified a grammatical meaning, that word or sequence of words would be considered as one unit.

Figure 4:
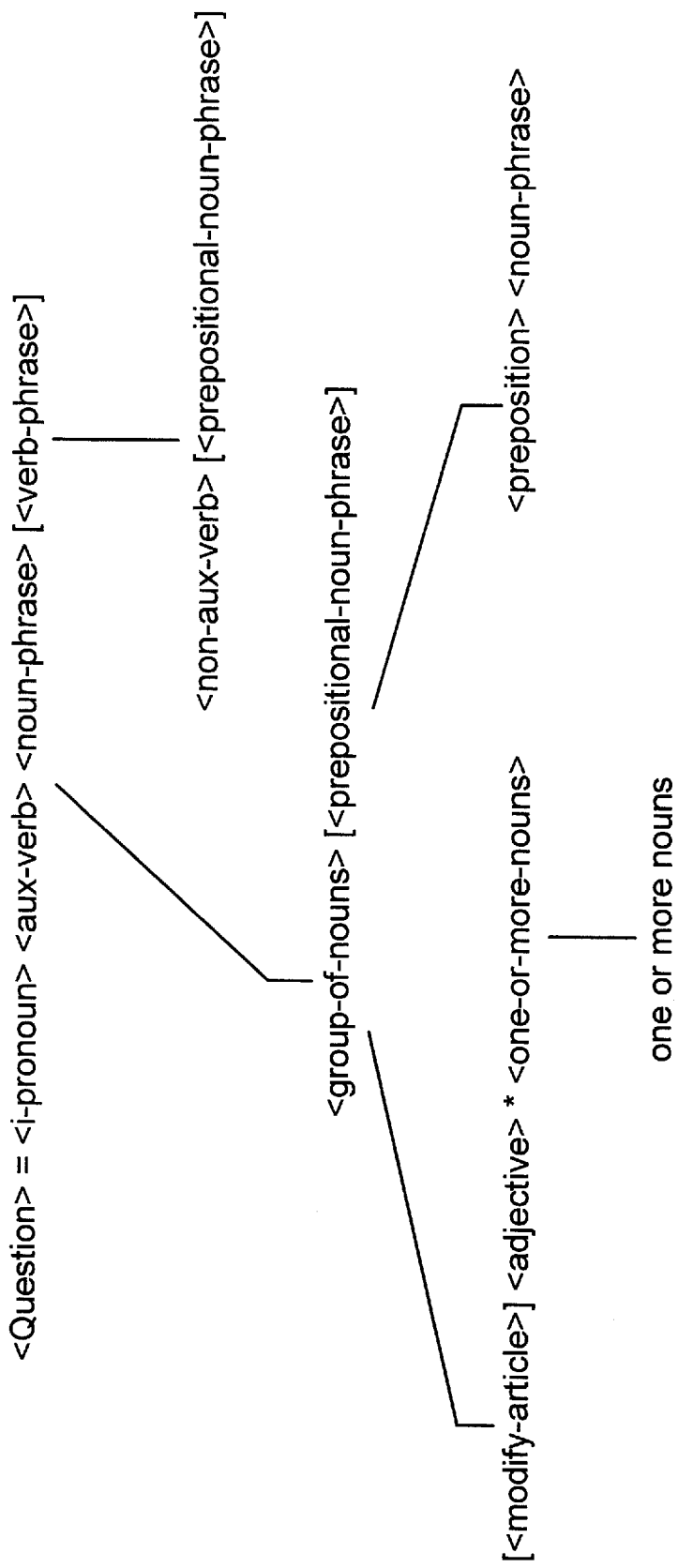
FIG. 4 shows a pre-defined context-free grammatical structure in the present invention.

In one embodiment, the pre-defined context-free grammatical structure is shown in FIG. 4 and is as follows:

```
<Question> = <i-pronoun><aux-verb><noun-phrase>[<verb-phrase>]
where: the symbols < > denote whatever inside is a meta-symbol, which has a
    grammatical meaning; the meta-symbol is not in the grammatical table.
    The symbols [ ] denote whatever inside the bracket is optional.
<I-pronoun> denotes an interrogative pronoun, which is a pronoun used in asking
    questions, and can be one of the following: what, when, where, who, whom,
    whose, which, and why.
<Aux-verb> denotes an auxiliary verb, and can be any form of the verb "to be," or
    "do."
<Noun-phrase> is defined as <group-of-nouns>[<prepositional-noun-phrase>]
    where: <group-of-nouns> is defined as:
        [<modify-article>]<adjective>*<one-or-more-nouns>;
``` the symbol * denotes zero or more;
   <modify-article> is defined as a modified article, including a, an, the, this, these and those; and
   <one-or-more-nouns> denotes one or more nouns; and
<prepositional-noun-phrase> is defined as a
   <preposition><noun-phrase>.
<Verb-phrase> denotes a non-aux-verb, and
   is defined as <non-aux-verb>[<prepositional-noun-phrase>].
<Preposition> denotes a preposition defined in the grammatical table.
<Non-aux-verb> denotes a verb defined in the
   grammatical table and is not an <aux-verb>.
<Noun> denotes a noun defined in the grammatical table.
<Adjective> denotes an adjective defined in the grammatical table.

---

The pre-defined structure is only one example to illustrate the present invention. Other context-free grammatical structures are applicable also. Generating different context-free grammatical structures should be obvious to those skilled in the art.

In the present invention, a word or a set of words that can fit into the structure of a meta-symbol is a grammatical component. For example, the phrase "with respect to x" is a grammatical component, whose grammatical meaning is a prepositional-noun-phrase.

In the present invention, grammatical rules and the pre-defined grammatical structures are linked. Once the rules are set, the structures are determined. Similarly, once the structures are determined, a set of rules can be found. For example, based on the pre-defined structures, one grammatical rule is that "a group-of-nouns preceding a prepositional-noun-phrase is a noun-phrase."

The grammatical table defines the grammatical meaning of each word. In one embodiment, the table is a part of the grammatical rules. In another embodiment, all the grammatical rules that define the grammatical meaning of each word are separated from the rest of the grammatical rules, and are grouped together to establish the grammatical table 114.

A number of examples on analyzing a question for parsing it into its grammatical components based on the pre-defined grammatical structure are:

1. What is the derivative of sin(x+4) with respect to x?
Starting from the right hand side,
(x) is a noun
so (x) is a group-of-nouns
so (x) is a noun-phrase
so (with respect to x) is a prepositional-noun-phrase
(sin(x+4)) is a noun
so (sin(x+4)) is a group-of-nouns
so (sin(x+4) with respect to x) is a <group-of-nouns><prepositional-noun-phrase>
so (sin(x+4) with respect to x) is a noun-phrase
so (of sin(x+4) with respect to x) is a prepositional-noun-phrase
(derivative) is a noun
(the) is a modify-article
so (the derivative) is a group-of-nouns
so (the derivative of sin(x+4) with respect to x) is a <group-of-nouns><prepositional-noun-phrase>
(is) is an aux-verb
(what) is an i-pronoun Thus, the question is of the structure
   <i-pronoun><aux-verb><group-of-nouns><prepositional-noun-phrase>.
2. Why is delta used in step 4 of the proof?
Starting from the right:
(proof) is a noun
(the) is a modify-article
so (the proof is a group-of-nouns
so (the proof is a noun-phrase
so (of the proof) is a prepositional-noun-phrase
(4) is a noun
(step) is a noun
so (step 4) is a group-of-nouns
so (step 4 of the proof) is a <group-of-nouns><prepositional-noun-phrase>
so (step 4 of the proof) is s noun-phrase
so (in step 4 of the proof) is a prepositional-noun-phrase
(used) is a verb as defined by the grammatical table
so (used in step 4 of the proof) is a verb-phrase
(delta) is a noun
so (delta) is a group-of-nouns
so (delta) is a noun-phrase
(is) is an aux-verb
(Why) is an i-pronoun
Thus, again the question is of the structure
   <i-pronoun><aux-verb><noun-phrase><verb-phrase>.
3. Why did President Nixon resign?
Starting from the right-hand side
(resign) is a verb
so (resign) is a verb-phrase
(Nixon) is a noun
(President) is a noun
(President Nixon) is a one-or-more-nouns
so (President Nixon) is a noun-phrase
(did) is an aux-verb
(Why) is an i-pronoun
Thus, the question is of the structure
   <i-pronoun><aux-verb><noun-phrase><verb-phrase>

Many questions cannot be parsed based on the pre-defined context-free grammatical structure. In this disclosure, these questions are considered as ambiguous questions, and will be analyzed through methods explained later in this disclosure. If there are more than one such pre-defined context-free grammatical structure stored in the system, the question entered will be parsed based on each structure individually. The question only has to be successfully parsed based on one such structure. If the question cannot be parsed based on all the pre-defined context-free grammatical structures, the question will be considered as an ambiguous question.

Programming-steps Generator

The programming-steps generator 108 transforms at least one grammatical component of the question using a set of semantic rules and one or both of the semantic table to generate a set of instructions. The semantic rules and the semantic tables depend on the pre-defined context-free grammatical structure, which the parsing process bases on. In one embodiment, the semantic rules are also embedded in the semantic tables. In a general sense, the generator 108 directs different grammatical components in the question to algorithms or to data in the topic-related tables.

To help explain the present invention, a number of functions are created as shown in the following:

Keys-Of(Table)
  This function extracts all the key attributes in the identified table.
Attributes-Of(Table)
  This function extracts all the attribute names in the identified table.
Attribute-Names({adjective}, Table)
  This function identifies one or more attributes when the {adjective} is applied to the table.
Attribute-Names({noun}, Table)
  This function identifies one or more attributes when the {noun} is applied to the table.
Attribute-Name({i-pronoun}, Table)
  This function identifies the attribute when the {i-pronoun} is applied to the table.
Tables-Of({proper noun})
  This function identifies one or more tables that contain the {proper noun} as a key value. It can be derived by the following program:

```
T-Names = " ";
for Table in {all Tables}   // {all Tables} is a list of topic-related tables
do
    for Key in Keys-Of(Table)
    do
        if any value of the attribute Key in the Table contains {proper noun}
            then T-Names = T-Names + Table
        endif
    endfor
endfor
return T-Names
```

Synonym({word})
  This function identifies the synonym corresponding to the word. The synonym can be found in the topic-independent-semantic table.

Methods to create the above functions should be obvious to those skilled in the art of programming.

Based on a number of semantic rules, the programming-steps generator 108 generates instructions based on the grammatical components in the question. The following shows examples of different instructions generated to illustrate the present inventions. The instructions generated are either in a SQL-like, a LISP-like or a C-like language though other programming languages are equally applicable.

A Proper Noun

A grammatical component in the question can be a proper noun, which implies that it has a grammatical meaning of a proper noun. One set of semantic rules is that the programming-steps generator 108 transforms the proper noun into instructions to select one or more topic-related tables, and then transforms other grammatical components in the question into instructions to select and to operate on data in the tables for answering the question.

Using the topic-dependent semantic table 118A, the programming-steps generator 108 first retrieves all tables where the proper noun is an attribute. Then, as shown in the topic-dependent semantic table, all key attributes in those tables are identified, and each of them is matched to the proper noun. The table of any key attribute that matches the proper noun is selected for additional operation by the remaining grammatical components in the question.

A proper noun may consist of more than one word, such as the "Bills of Right." A proper noun can be a lower-case word, such as "moon."

In one example, the corresponding instructions are as follows:

```
for Table in Table-Of({proper noun})
do
    for Key in Keys-Of(Table)
    do
        x = (SELECT ...
             FROM Table
             WHERE Key MATCH {proper noun})
             // The above clause has the meaning of "where the key attribute
             // in the table matches the proper noun."
        if x is valid then done
             // if the SELECT function successfully identifies one or more attributes,
             // x is valid.
    endfor
endfor.
```

Common Nouns

One grammatical component in the question can be a common noun. The programming-steps generator 108 might transform the common noun into instructions to select a topic-related table, an attribute name, a synonym of an attribute name, the data under an attribute, or an algorithm.

Figure 5A:
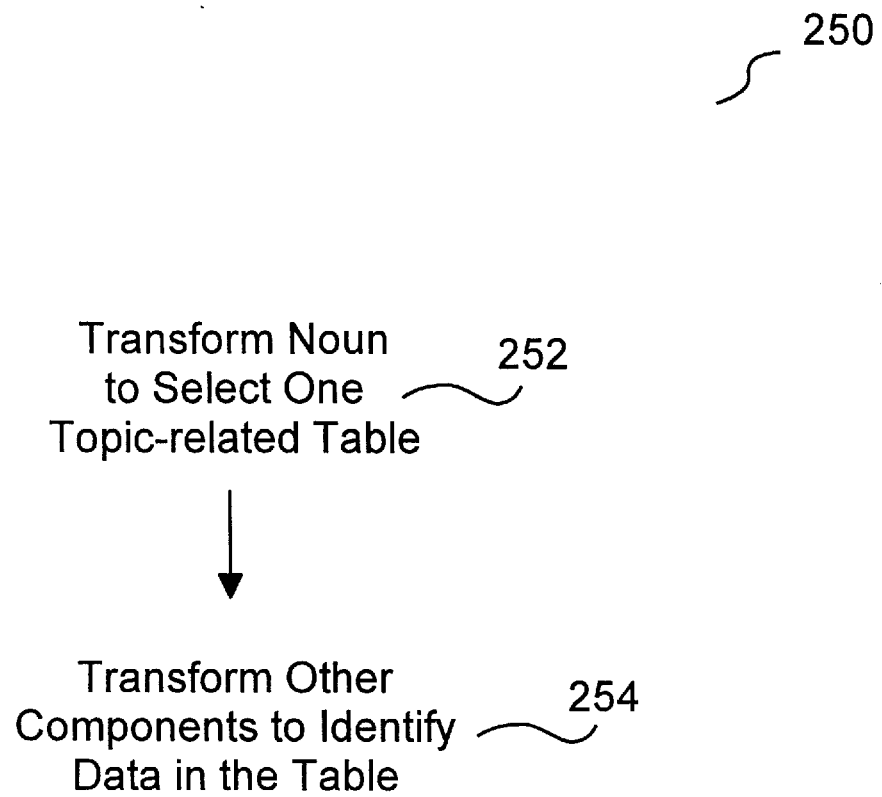
FIGS. 5A–B show examples of semantic rules applied to nouns in the present invention.

As shown in FIG. 5A, if the noun is the name of a topic-related table as shown by the topic-dependent semantic table 118A, then the programming-steps generator transforms the noun into instructions to select (Step 252) that topic-related table, and transforms (Step 254) other components in the question to identify data in the table and to operate on them, if necessary.

If the noun denotes an attribute name or a synonym of an attribute name, again as shown by the topic-dependent semantic table 118A, the programming-steps generator searches and identifies the attribute based on the noun. The instruction generated can be, for example, modifying a SELECT clause as follows:

```
for Attribute in Attribute-Names({noun}, Table)
do
    SELECT Attribute from Table
    ...
endfor
```

After all of the relevant attributes have been identified, data in them are retrieved for further processing by other parts of the question to generate an answer.

If the noun denotes the data under an attribute, the programming-steps generator identifies the data, with its corresponding attribute and table. The instructions generated can be, for example, (1) identifying each table in the function Tables-Of({noun}); (2) for each table identified, the function Attribute-Names({noun}, Table) returns the corresponding attributes containing the {noun} in that table; and (3) the remaining parts of the question operate on information under each attribute to generate the answer to the question. One set of instructions achieving such objectives is as follows:

```
for Table in Tables-Of({noun})
do
    ...
    for Attribute in Attribute-Names({noun}, Table)
    do
        SELECT...
            FROM Table
            WHERE Attribute = {noun}
        ...
    endfor
    ...
endfor
```

Figure 5B:
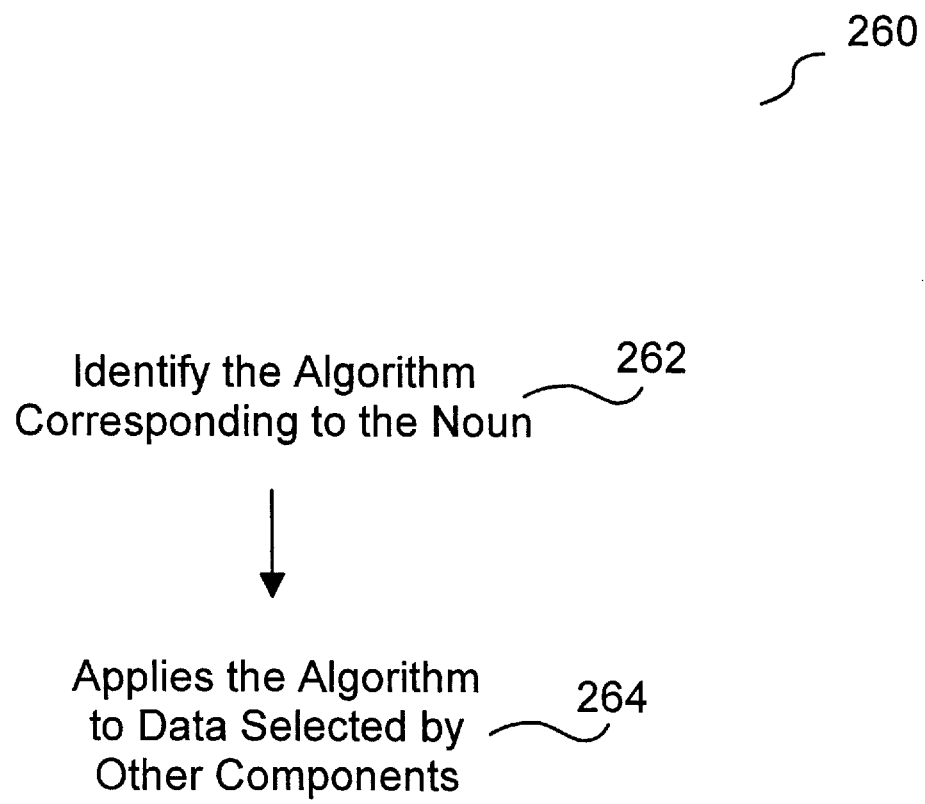

As shown in FIG. 5B, the programming-steps generator might identify the algorithm (Step 262) corresponding to the noun; the algorithm is then applied (Step 264) to data selected by grammatical components in the question other than the common noun. For example the noun "sum" indicates accumulating results; the noun "count" indicates computing the cardinality of the results; and the noun "product" in mathematics indicates multiplying results. The topic-independent semantic table 118B can point to locations to get the algorithm.

A Group of Nouns

If the question includes a group of nouns linked together, such as X1 X2 X3 . . . Xn, then X1 to Xn-1 can modify the final noun Xn, which is known as the primary noun. In other words, the programming-steps generator operates on the primary noun as a common noun, or a proper noun, whichever it may be, and the remaining nouns X1 to Xn-1 further operate on data/table(s) selected by the primary noun.

Non-Auxiliary Verbs

One grammatical component can be a non-auxiliary verb. It relates to one or more events or an action, which has a number of attributes; and it might have words with similar meaning. One approach is to identify the verbs with similar meaning. Then other components in the question identify data in the attributes of the identified verbs for answering the question.

A verb can be related to many different events. As an example, the verb is "nominate": one event can be President Bush being nominated to be the President, and another event can be President Clinton being nominated to be the President.

However, an event is related to a verb. The attributes of the event can have a subject-agent, which is the agent performing the event, such as the party nominating the president. Typically, the preceding noun phrase before the verb identifies the subject-agent. The event can have an object-agent if the verb is a transitive verb, which is the agent acted upon by the event, such as the president being nominated.

Each event has a duration that is between a starting and an ending time. For example, if the event is "walk" its duration starts with the sole of a foot changing its position from touching the ground to not touching the ground, and then ends with the sole back to touching the ground again.

Non-auxiliary verbs are grouped together in an event table, which is a topic-related table, with the topic being events. The following is an example of an event in the table:

```
CREATE TABLE EVENT (
    Verb_word       Character String NOT NULL,
                    // The verb that associates with the event
    Subject_Agent   Character String,   // Agent name performing the event
    Object_Agent    Character String,   // Agent name acted upon by the
                                        //event
    Start_Time      Time,               // Starting time of event
    End_Time        Time,               // Ending time of event
    Description     Character String,   // Describes the event
    KeyId           Integer,            // Unique number identifying the event
)
```

The subject-agent, object_agent etc. are attributes related to the verb_word, which is associated with an event.

There might be non-auxiliary verbs with similar meaning as the non-auxiliary verb in the question. These verbs can be identified by the synonym in the topic-independent semantic table. As an example, the verbs of breathe and inhale have similar meaning.

Figure 6:
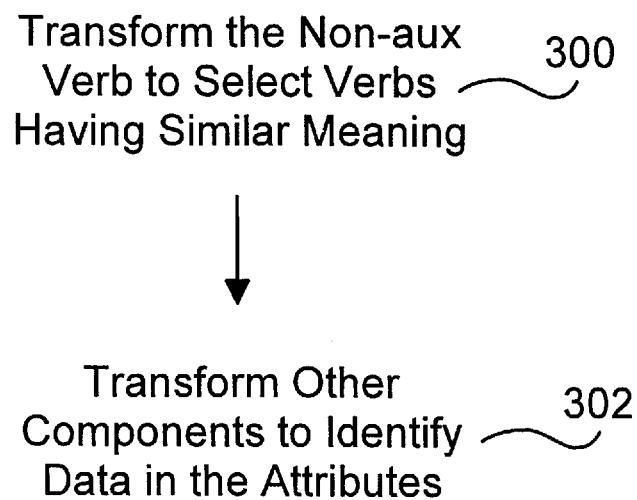
FIG. 6 shows an example of semantic rules applied to a non-auxiliary verb in the present invention.

As shown in FIG. 6, the programming-steps generator 108 transforms the non-auxiliary verb in the question into one or more instructions, which select (Step 300) one or more verbs with their attributes in the event table. The one or more verbs have similar meaning as the non-auxiliary verb. Then other components in the question identify data (Step 302) in the attributes for answering the question. The selected verbs can be put into a temporary table or a view (a database terminology) as follows:

```
CREATE VIEW Verb_View({verb}) As
    View is a logical table that is created only when it is needed.
    // All events matching {verb} are grouped from the event table
    // to form the view.
    SELECT * FROM EVENT
        // here * denotes all of the attributes
        WHERE Synonym({verb}) = Verb_word;
```

The attributes of the selected verbs are also identified. Then, the programming-steps generator 108 generates additional instructions based on other components in the question to identify data (Step 302) in the selected attributes for answering the question.

Events might be related. Two events may form a sequential relationship, where one event follows another event, such as eat and drink. Two events may form a consequential relationship, such as braking and stopping, with the braking event causing the stopping event. Many small events may make up a big event, with the big event containing the small events; this leads to containment relationships. Also, events may be related because they involve the same subject-agent; and events may be related because they involve the same object-agent.

An event-relationship table describes relationships among events. It can have the following format:

```
CREATE TABLE EVENT_RELATIONSHIP (
    KeyId1         Integer,    // KeyId of an event
    KeyId2         Integer,    // KeyId of another event
    Relationship   Character String,
        //Relationship, such as sequential, consequential,
            containment etc.
)
```

Interrogative Pronouns

Based on the interrogative pronoun in the question, the programming-steps generator 108 generates one or more instructions to select one or more attributes in one or more tables. Those tables have been selected by grammatical components in the question other than the interrogative pronoun. The function Attribute-Name({i-pronoun}, Table) generates the attribute name corresponding to the {i-pronoun}.

One way to generate a SQL-like instruction corresponding to the {i-pronoun} is to modify a SELECT clause:

SELECT Attribute-Name({i-pronoun}, Table) FROM Table

Determiners

Examples of a set of semantic rules on determiners are:
If the determiner is "a" or "an," select any result from the previous query.
If the determiner is "some," select more than one result from the previous query. If the previous query yields only one result, that result will be selected.
If the determiner is "all," select all result from the previous query.
If the determiner is "the," modify the following SELECT function with DISTINCT, as will be shown by examples below.

Auxiliary Verbs

An auxiliary verb together with either its immediate noun phrase or a non-auxiliary verb determine whether the answer should be singular or plural.

Adjectives

Figure 7:
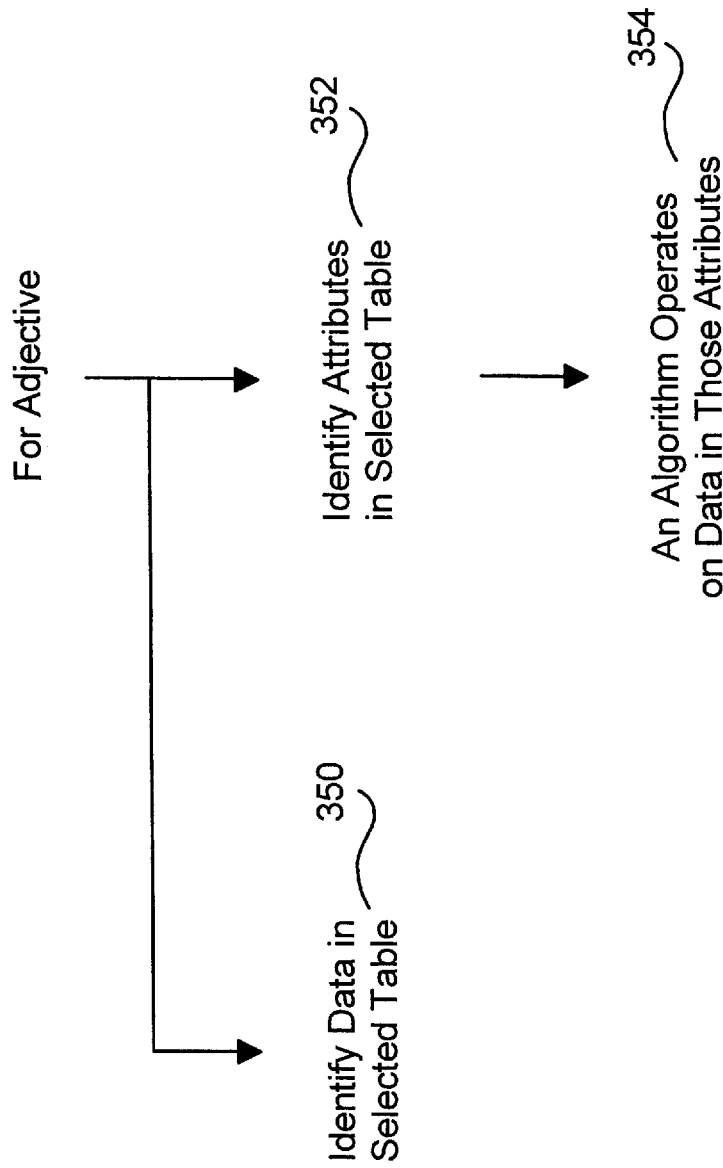
FIG. 7 shows examples of semantic rules applied to adjectives in the present invention.

One grammatical component of the question can be an adjective. As shown in FIG. 7, based on the adjective, the programming-steps generator either identifies the value of an attribute, or identifies an algorithm. The grammatical components in the question other than the adjective have already selected one or more topic-related tables.

As shown by the topic-independent semantic table, the adjective may identify (Step 350) an attribute. The function Attribute-Names({adjective}, table) can retrieve the attribute in the table previously selected. The corresponding instruction can be:

```
for Attribute in Attribute-Names({adjective}, Table)
do
    SELECT ...
        FROM Table
        WHERE Attribute = {adjective}
        // or "Where the attribute in the table is equal to the adjective."
    ...
endfor
```

As an example, the noun phrase is "a red apple." The noun "apple" can be associated with a table known as FRUIT, and the Attribute-Names(red, FRUIT) yield the attribute "color." The adjective "red" is interpreted:

WHERE color="red."

If there is a sequence of such adjectives, all of them can apply to the same table. The WHERE clause would be a conjunction of the adjectives, such as:

```
WHERE
    for Attribute1 in Attribute-Names({adjective1}, Table)
    do
        for Attribute2 in Attribute-Names({adjective2}, Table)
        do
            SELECT ...
                FROM Table
                WHERE Attribute1 = {adjective1}
                and Attribute2 = {adjective2}
        endfor
    endfor
```

An adjective can refer to an algorithm, as identified by the topic-independent semantic table. Grammatical components in the question other than the component that is the adjective have selected one or more topic-related tables. As shown in the topic-independent semantic table, the adjective identifies (Step 352) one or more attributes in those tables. Then the algorithm operates (Step 354) on one or more data in those attributes.

As an example, the adjective is "first." The topic-independent semantic table indicates that the adjective is an algorithm sorting a list of data in ascending order; the table also identifies the data in one or more attributes in one or more topic-related tables. For each attribute identified, after sorting its data, the first value will be the result. For example, the question is "Who is the first President?" The table identified is the President table. The attribute whose data are to be sorted is the "date" attribute, which identifies the time each President was elected. The instruction corresponding to the adjective "first" can be as follows:

```
for Attribute in Attribute-Names(first, Table)
    do
        SELECT . . .
            FROM Table
            ORDER BY Attribute ASC
        . . .
    endfor
```

The symbol ASC denotes ascending.

Similarly, if the adjective is "last," then the attribute whose data are ordered is the same, but the data are sorted in a descending manner. The corresponding instruction can be as follows:

```
for Attribute in Attribute-Names(last, Table)
    do
        SELECT . . .
            FROM Table
            ORDER BY Attribute DESC
        . . .
    endfor
```

The symbol DESC denotes descending.

Another example on adjective is the word, "immediate." Its interpretation depends on the word it modifies. In one example, if the word modified is "action," the word "immediate" has the same effect as the word, "first;" if the word modified is "cause," the word "immediate" has the same effect as the word "last."

There can be a sequence of adjectives. Then, the above analysis is applied in the same order as the occurrence of the adjectives.

Preposition

One grammatical component can be a preposition. A preposition can modify its previous noun phrase or verb, such as by operating on them through an algorithm identified in the topic-independent semantic table. Under some situations, with one or more tables selected by at least one grammatical component in the question other than the component that is the preposition, the algorithm identified operates on data or values in the one or more selected tables.

Under some other situations, for example, due to the prepositions 'of' and 'in', the programming-steps generator processes the grammatical component succeeding the preposition before the grammatical component preceding.

For another example, the preposition 'before' can modify the WHERE clause with a comparison on time:

{time of preceding event}<{time of succeeding event}

Programming-Steps Executor

The executor 112 executes at least one set of instructions generated from one grammatical component to at least access data from the database to generate an answer for the question, if there is one.

In one embodiment, after the programming-steps generator 108 generates a set of instructions, the programming-steps executor 112 executes them. The set may be generated from one grammatical component. This process repeats until all sets are generated and executed to answer the question. For at least one set of instructions, the executor 112 accesses data from one or more topic-related tables identified by the instructions. In another embodiment, all the instructions are generated; then the program executor 112 runs the instructions, which include accessing data from one or more topic-related tables identified by the instructions, and processing those data for generating the answer to the natural-language question.

In the appendix there are a number of examples of instructions illustrating the present invention. They are generated to answer different types of grammatically-context-free questions.

Ambiguous Questions

In the present invention, the grammatical structure analyzer 102 may decide that the natural-language question cannot be parsed into grammatical components based on the pre-defined context-free grammatical structure. For example, the grammatical components of the question cannot fit into the pre-defined structure. Then the question is considered ambiguous, and an answer cannot be generated.

Figure 8:
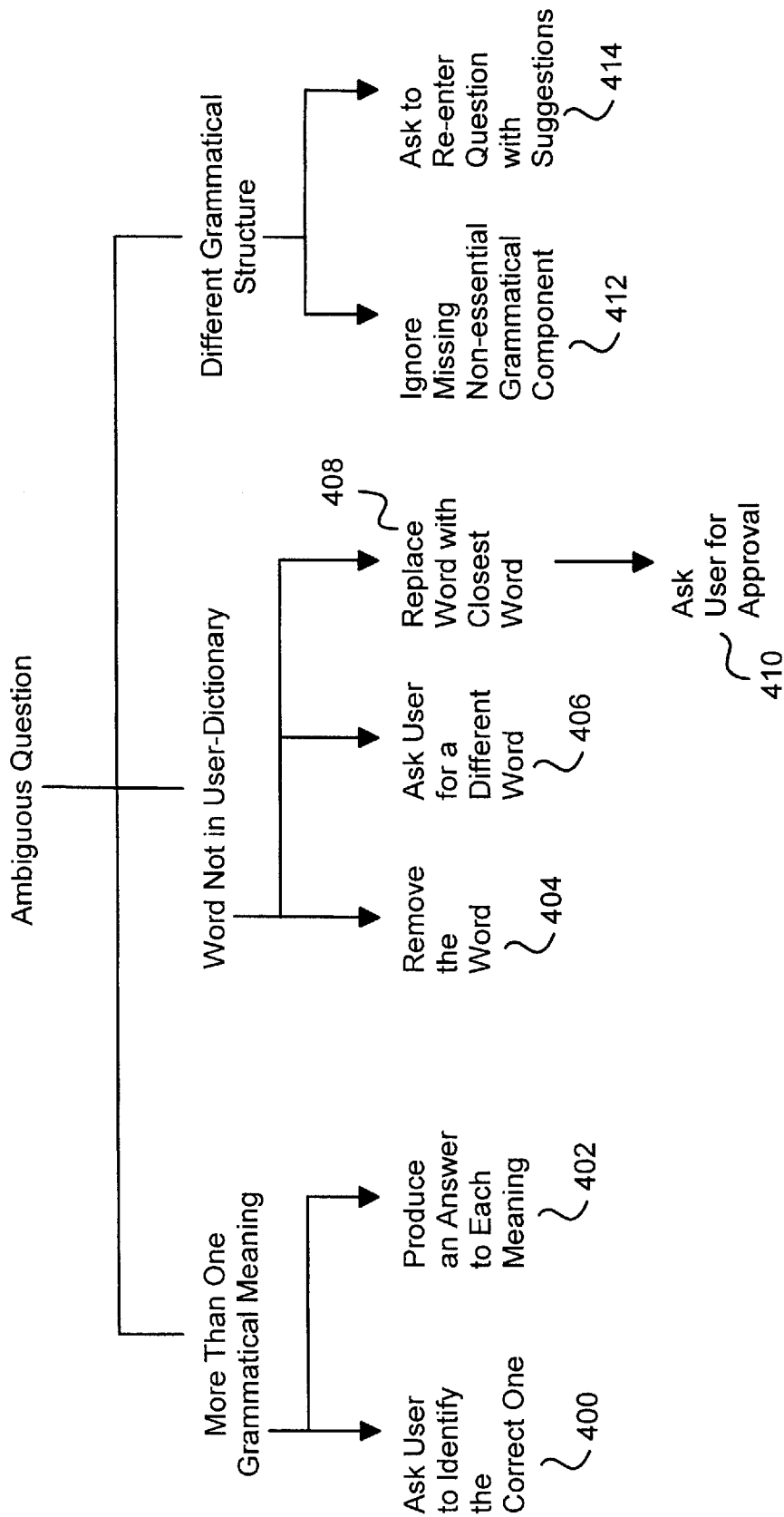
FIG. 8 shows different approaches to resolve ambiguous question in the present invention.

Ambiguity may be due to a number of reasons. For example, the question may contain words with non-unique grammatical meaning, the question may contain words not in the grammatical table, or the grammatical structure of the question is different from the pre-defined grammatical structure. FIG. 8 shows different approaches to resolve the ambiguity.

The grammatical structure analyzer can decide that a word can be of more than one grammatical meaning, such as it can be a noun and a verb. In one embodiment, the analyzer produces (Step 402) an answer for each meaning and ignores those meaning with no answer. In another embodiment, the analyzer asks (Step 400) the user to identify the correct grammatical meaning.

For example, the question is: "When was the Persian Gulf war?" The word "war" can be a noun or a verb. In one embodiment, the analyzer asks the user whether the word "war" is a noun or a verb. Based on the user's response, the question is analyzed. In another embodiment, the analyzer generates answers to both the question that treats the word "war" as a verb, and the question that treats the word "war" as a noun. Both answers, if available, are presented to the user.

If the grammatical structure analyzer decides that the question contains one or more words not in the grammatical table, in one embodiment, the analyzer removes (Step 404) the unrecognized word and processes the remaining words in the question. In another embodiment, the analyzer asks (Step 406) the user for a different word. The analyzer might assume that the word is mis-spelled, and ask the user to correct it; the analyzer might replace (Step 408) the un-recognized word with a word in the grammatical table most similar to or with minimum number of different characters from the unrecognized word. The analyzer then presents (step 410) the matched word to the user to ask if that is the right word. A list of matched words may be presented for the user to select.

For example, the question is: "What exactly are the Bills of Right?" The word "exactly" is an adverb and is not in the grammatical table. The word is dropped, and the question, satisfying the grammatical structure, is analyzed. In another example, the question is: "What is the Bill of Right?" Here, the "Bill of Right" should be the "Bills of Right." The analyzer can ask the user to spell the "Bill of Right" again; or the analyzer can find the term closest in spelling to the un-recognized term, and identify the term to be the "Bills of Right". The identified word is presented to the user to ask if that is the right spelling.

In the present invention, the grammatical structure of the question entered may be different from the one or more pre-defined context-free grammatical structures in the system.

In one embodiment, a non-essential grammatical component is missing from the question. A grammatical component is non-essential if that grammatical component can be removed from the question without changing the answer to the question. For example, an auxiliary verb in certain condition can be non-essential. One approach to solve this problem is to ignore (Step 412) the missing grammatical component in generating the answer to the question. Another approach is to add the missing non-essential grammatical component back into the question, and present to the user asking if that is correct. For example, the question is: "When President Nixon resign?" An auxiliary verb is expected after the word "When"; such a word is entered into the question, which is then submitted to the user for approval.

In another embodiment, the user is suggested to re-enter (Step 414) the question with advice as to the appropriate question structure. One advice is to ask the user to re-enter the question based on the pre-defined structure, such as using one of the i-pronouns in the pre-defined grammatical structure. This can be done, for example, by citing a list of acceptable i-pronouns, and a list of model questions using the i-pronouns as examples. Another advice is to identify nouns and non-auxiliary verbs, if any, in the question, and to ask the user which of the identified word or words he wants to know more about. Then it would be up to the user to select the one he wants. In a further embodiment, the identified word or words are fit into alternative grammatical structures, and the user is asked to select one structure out of the list of suggested structures.

As an example, the question is: "Do you know when President Nixon resign?" Assume that such a question does not fit the pre-defined grammatical structure. The user is suggested to re-enter the question using one of the following i-pronouns: What, when, where, why and who. In another embodiment, the noun and the auxiliary verb are identified, and they are "President Nixon resign." The user is asked, "You want to know about 'President Nixon resign?'" In yet another embodiment, the identified words are fit into the following question formats, and it would be up the user to select one, for example:

What does President Nixon resign?

When does President Nixon resign?

Where does President Nixon resign?

Why does President nixon resign?

Who does President Nixon resign?

As another example, the question is: "Is there a reason why President Clinton sent troops to Bosnia?" Assume that the question does not fit the pre-defined grammatical structure. In one embodiment, the user is suggested to re-enter the question using one of the i-pronouns in the pre-defined grammatical structure. In another embodiment, the nouns and the non-auxiliary verbs, "President Clinton", "troops" "send" and "Bosnia" are identified. Then the user is asked to select one or more of the following questions:

Do you want to know about President Clinton?

Do you want to know about troops?

Do you want to know about Bosnia?

Also, the system 100 can present suggestions to the user on ways to rephrase the original question based on the noun and the non-auxiliary verbs. It would then be up to the user to select the one he wants.

In certain situation, the present invention does not have any answer. As an example, the grammatical table does not have some essential terms X in the question. Then, the present invention can return the following message:

Sorry, I do not know anything about X. You may want to check with your instructor. If you wish, I will inform your instructor your question. {Click here to inform your teacher}

If the user clicks at the designated area, his last question will be automatically sent as an electronic mail to an instructor who can answer the user directly. This instructor may be previously selected by the user, or the guardian of the user.

Questions Matching Engine

Figure 9:
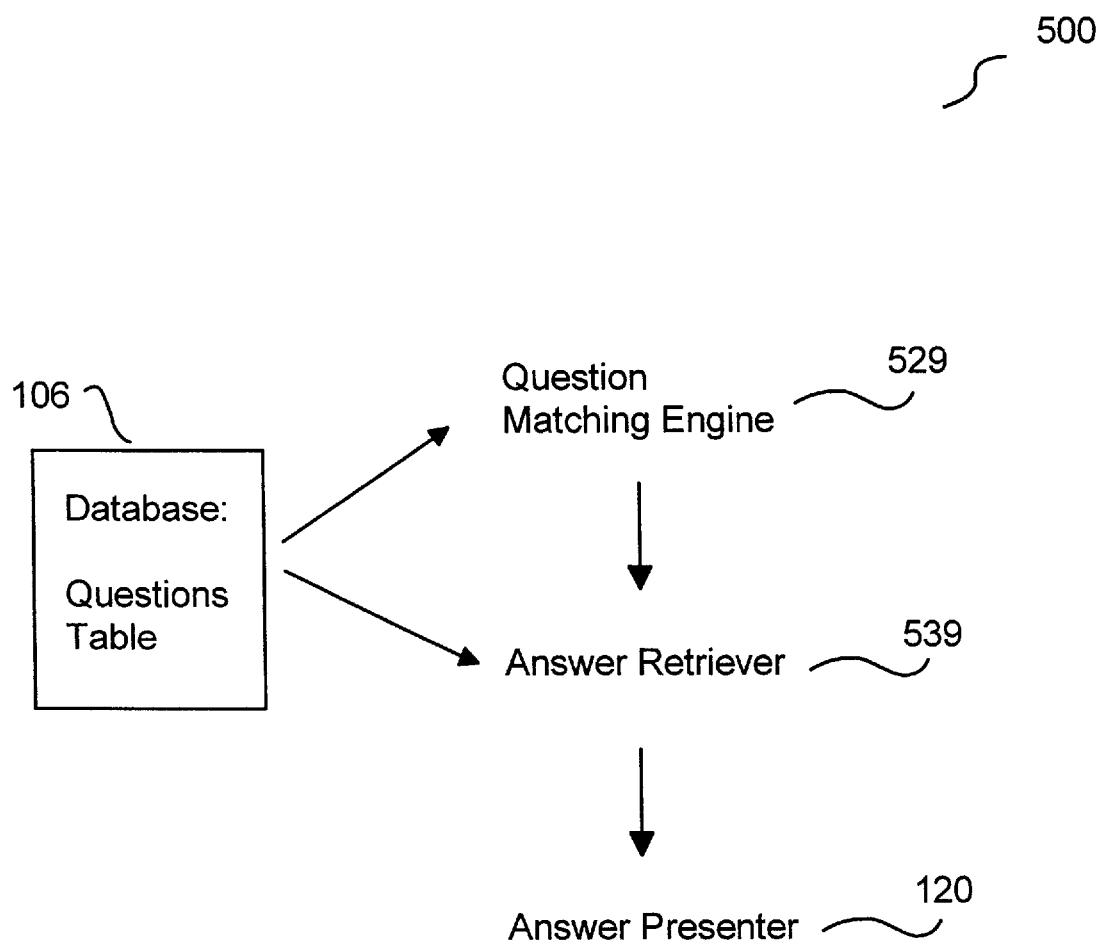
FIG. 9 shows another embodiment of the present invention.

The above embodiments can answer an infinite number of questions. FIG. 9 illustrates another embodiment 500 of the present invention, which provides answers to a finite number of questions, but requires fewer steps to generate answers as compared to the embodiment shown in FIG. 1. Also, the embodiment 500 can answer non-naturals language questions, and grammatically-context-dependent questions. In this embodiment 500, the database 106 includes a questions table, which contains many questions, each with its corresponding answer. A question matching engine 529 compares the question entered with questions in the database. An answer retriever 539 retrieves the answer to the question in the database that matches the entered question. A presenter then presents the answer to the user.

Figure 10:
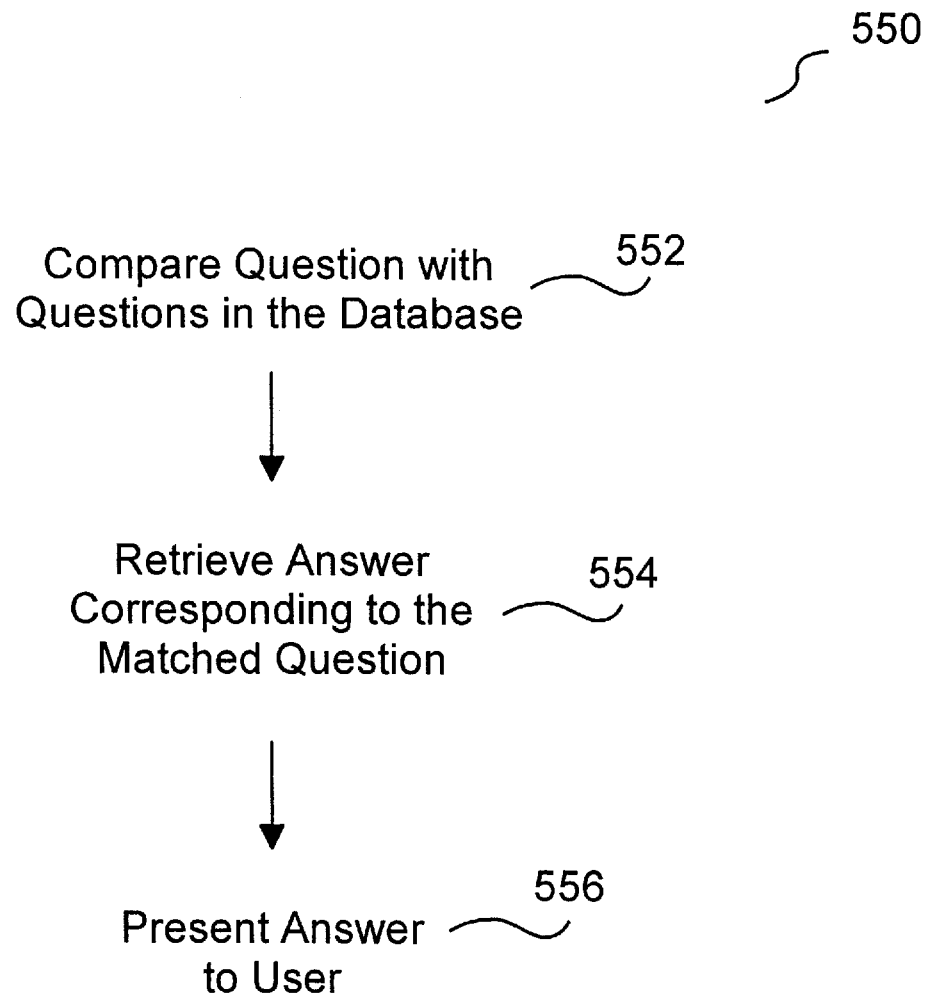
FIG. 10 shows a set of steps to be used by the embodiment shown in FIG. 9.

FIG. 10 shows one set of steps 550 for the present embodiment. The question matching engine 529 compares (Step 552) the entered question with questions in the database 106. If there is a match with any one of them, the answer retriever 639 retrieves (Step 54) the answer corresponding to the matched question, and the presenter presents (Step 556) the answer to the student. If no question in the table matches the input question, the embodiment 500 might use one of the approaches discussed in the ambiguous questions section to answer the question.

In another embodiment, the question entered is a natural-language question. The matching engine 529 compares the grammatical components of the natural language question with components of the questions in the database 106.

A further embodiment includes an essential-components extractor, which extracts essential components from the natural-language question entered. Only essential components are compared with the pre-stored questions, which have essential components. If there is a match, the answer to the corresponding matched question is retrieved and is presented to the student. As an example, an auxiliary verb is a non-essential components. The extractor strips off the auxiliary verb from the question to allow the matching engine 529 to compare the rest of the components.

In yet another embodiment, the question entered is a grammatically context-free question.

The embodiment 100 shown in FIG. 1 can be combined with the embodiment 500 shown in FIG. 9. The question entered is first analyzed by the embodiment 100 shown in FIG. 1. If the question cannot be parsed into its grammatical components based on the pre-defined structure, then the question is passed to the embodiment 500 shown in FIG. 9. If that embodiment cannot find a match in the questions table, the question will be considered as an ambiguous question to be resolved by approaches discussed in the ambiguous questions section.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

Appendix

The following shows examples of instructions automatically generated to answer different types of grammatically-context-free questions using the embodiment shown in FIG. 1.

1. Who is the first President?

```
for Table in each Tables-Of(President)
do
    for Attribute1 in Attribute-Names(President, Table)
    do
        for Attribute2 in Attribute-Names(first, Table)
        do
            res = (SELECT DISTINCT Attribute-Name(who, Table)
                FROM Table
                WHERE Attribute1 = "President"
                ORDER BY Attribute2 ASC)
            if (res is not empty) return {first element of results}
        end for
    end for
end for
return {error, no solution found}
```

2. What are the Bills of Right?

```
answer = ""
for Table in each Tables-Of("Bills of Right")
do
    for Key in Keys-Of(Table)
    do
        x = (SELECT Attribute-Name(what, Table) FROM Table
            WHERE Key LIKE 'Bills of Right');
        answer = answer + x
    endfor
endfor
if answer is not empty, return answer, otherwise return error.
```

3. Where is the capital of Texas?

There are two nouns in this question: capital and Texas. In one embodiment, each noun is associated with a topic-related table. The preposition "of" indicates that the table associated with Texas should take precedence over the capital table.

This question can have two different answers. The answer can be the geographic location as shown on a map, or the answer can be the city Austin. One embodiment generates the following instructions, with x denoting Austin, and y denoting geographic location:

```
for Table in each Tables-Of(Texas)
do
    for Key in Keys-Of(Table)
    do
        for Attribute in Attribute-Names(capital, Table)
        do
            x = (SELECT DISTINCT Attribute
                FROM Table
                WHERE Key LIKE Texas)
            if(x is valid) then goto found
        end for
    end for
end for
if {x is not valid) or (x has more than one value) then return error
found:
for Table in Tables-Of(x)
do
    for Key in Keys-Of(Table)
    do
        y = (SELECT DISTINCT Attribute-Name(where, Table)
            FROM Table
            WHERE Key LIKE x)
            if (x is valid) then goto found
        end for
    end for
end for
return {error, no solution found}
```

4. What is the immediate cause of the Civil War?

In this example, the word "immediate" when linked with the noun "cause" is equivalent in meaning to the word "last."

```
for Table in each Tables-Of("Civil War")
do
    for key in Keys-Of(Table)
    do
        for Attribute1 in Attribute-Names(cause, Table)
        do
            for Attribute2 in Attribute-Names(last, Table)
            do
                x = (SELECT Attribute1 FROM Table
                    WHERE Key LIKE "Civil War"
                    ORDER BY Attribute2 DESC)
                if (x is valid) then return {first element in x}
            end for
        end for
    end for
end for
```

5. Why did President Nixon resign?

Events about "President Nixon resign" are extracted into a local table T. Then the causes of all such events are identified.

```
CREATE LOCAL TABLE T AS
    (SELECT * FROM Verb_View(resign)
        WHERE subject-agent = "President Nixon");
SELECT A.description
    FROM EVENT A, T, EVENT-RELATIONSHIP R
    WHERE R.KeyId1 = A.KeyId
    AND R.KeyId2 = T.KeyId
    AND R.relationship = "consequence";
```

The following examples 6–9 depend on tables, such as the President tables, generated above.

6. Who is the third President?

```
names = (SELECT DISTINCT Name FROM PRESIDENT
    ORDER BY Start_Year ASC)
return the 3rd name.
```

These instructions assume Tables-Of(President) contains only one table, and Attribute-Names('third', PRESIDENT) yields only a single attribute.

7. Who is the President after John Kennedy?

```
SELECT DISTINCT Name FROM PRESIDENT
    WHERE Start_Year>(SELECT Start_Year FROM
    PRESIDENT WHERE Name LIKE "John Kennedy")
ORDER BY Start_Year DESC;
select the first result.
```

8. When did President Lyndon Johnson die?
SELECT Death_Date FROM PRESIDENT WHERE Name LIKE "Lyndon Johnson";

9. When was President Nixon born?
SELECT Birth_Date FROM PRESIDENT WHERE Name LIKE "Nixon"

A number of mathematical examples are shown in the following using the programming language Lisp. Some examples might use mathematical software packages.

For mathematics problems, there can be an additional topic-related table, known as the mathematics table. The mathematics table might include high-level attributes, such as fraction, ratio, derivative, theorem, complex-number, matrix etc. Each of these high-level attributes can have a definition attribute describing the mathematical concept; a reference attribute identifying the study material covering the concept; and an algorithm attribute, if there is one. In another embodiment, the algorithm attribute references a mathematical software package. A high-level attribute can be a theorem, such as the Mean Value Theorem. In its corresponding definition attribute, there will be an explanation for that theorem. Note that, in this example, the algorithm attribute is not in the topic-dependent semantic table.

Most mathematical questions are 'what-is' questions. If a question is of the form 'What is X?', where X is a mathematical term, the system generates the following instruction:

SELECT definition FROM T mathematics table WHERE T.name=X; If the question is 'What is X <prepositional-noun-phrase>?', the <prepositional-noun-phrase> modifies the term X. The system retrieves X and applies the operations to the terms indicated by the prepositions.

10. What is the ratio between 7 and 8?

From the mathematics table, the attribute "ratio" is identified. Its algorithm attribute operates on two terms, as specified in the prepositional-phrase "between 7 and 8." For example:

(ratio 7 8)

11. What is the derivative of sin(x^2+4) with respect to x?

Again, the question is of the structure: "What is X <prepositional-noun-phrase>?" X is "the derivative," and the noun-phrase is "sin(x+4) with respect to x." The algorithm specified by the "derivative attribute" in the mathematics table has two operants, u and v, with the first operant, u, being the noun immediately after the preposition. In this example, u is equal to sin(x^2+4), and the second operant is v. The system can invoke a mathematics software package to solve the differentiation, d(sin(x+4))/dx. One LISP representation is as follows:

(derivative 'x'(sin (+(* x x) 4)))

12. What is the product of {matrix-1} and {matrix-2}?

The LISP representation is as follows:

(matrix-mul <matrix-1><matrix-2>)

13. What is the sum of the product of 3 and 4, and the ratio of 7 and 8?

The LISP representation is as follows:

(+(* 3 4)(ratio 7 8))

Not all mathematics questions are 'What-is' questions. The user may not understand certain steps in a derivation he is studying on the screen. Such questions are typically 'Why-is' questions. In one embodiment, the system identifies the study material, as in the current screen or the last screen he has been focusing on. Nouns used in the question are mostly from those study material. By associating the question with the study material and accessing a database of explanation terms in the study material, the system can generate an answer to the question.

14. Why is delta used in step 4 of the proof?

The structure of the question is: Why is <noun phrase><verb phrase>. The system (a) Identify the verb in the verb phrase to be the word "used."

(b) Identify one or more sets of events algorithm corresponding to the word "used" in the mathematics table. The sets of algorithm are applicable to the structures of X using Y.

(c) Identify X to be (delta).

(d) Identify Y to be (in step 4 of the proof).

(e) Identify the i-pronoun and the aux-verb as "Why is."

(f) Select the set of algorithm for explaining the relationship between X and Y. In this case, the set selected explains why X used Y.

(g) The algorithm searches for delta in step 4 of the proof in the materials just presented to the user. After identifying the proof, step 4 and delta, the system explains the step 4 of the proof with special focus on delta.

I claim:

1. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules; and transforming, by the system, at least one component into one or more instructions, using one or more semantic rules and the database, for generating the answer to the natural-language question;

wherein the step of analyzing includes the steps of:

scanning the question to extract each word in the question; and parsing the question by applying the grammatical rules and the database on each of the extracted word to identify its grammatical meaning and to match the question with the pre-defined grammatical structure;

a word in the question is not in the database; and the method further comprises the steps of replacing the word with a word in the database with a minimal number of different characters from the word not in the database.

2. A database-processing method as recited in claim 1 wherein after the step of transforming, the method further comprising the step of executing, by the system, the one or more instructions to at least access data from the database for generating the answer to the natural-language question.

3. A database-processing method as recited in claim 1, wherein the pre-defined grammatical structure includes an interrogative pronoun, followed by an auxiliary verb, which is followed by a noun-phrase.

4. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules;

transforming, by the system, at least one component into one or more instructions, using one or more semantic rules and the database, for generating the answer to the natural-language question;

wherein the step of analyzing includes the steps of:

scanning the question to extract each word in the question; and parsing the question by applying the grammatical rules and the database on each of the extracted word to identify its grammatical meaning and to match the question with the pre-defined grammatical structure; and the pre-defined grammatical structure includes an interrogative pronoun, followed by an auxiliary verb, which is followed by a noun-phrase;

the noun-phrase includes a group-of-nouns followed by a prepositional-noun-phrase;

the group-of-nouns includes a modify-article followed by an adjective followed by one or more nouns;

the prepositional-noun-phrase includes a preposition followed by a noun-phrase;

the question further includes a verb-phrase following the noun-phrase; and the verb-phrase includes a non-auxiliary verb followed by a prepositional-noun-phrase.

5. A database-processing method as recited in claim 1, wherein one grammatical component is a noun;

the database includes one or more topic-related tables, where each table identifies a plurality of data related to a topic; and the step of transforming includes the steps of:
transforming the noun into one or more instructions to select one topic-related table from the database; and
transforming the grammatical components in the question other than the component that is the noun into one or more instructions for at least identifying data in the selected table.

6. A database-processing method as recited in claim 1, wherein one grammatical component is a noun; and the step of transforming includes the steps of:
identifying the algorithm corresponding to the noun; and
applying the algorithm to data selected by grammatical components in the question other than the component that is the noun.

7. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules; and transforming, by the system, at least one component into one or more instructions, using one or more semantic rules and the database, for generating the answer to the natural-language question;

wherein
the step of analyzing includes the steps of:
scanning the question to extract each word in the question; and
parsing the question by applying the grammatical rules and the database on each of the extracted word to identify its grammatical meaning and to match the question with the pre-defined grammatical structure;

one grammatical component is a non-auxiliary verb;

the database includes an event table containing a plurality of non-auxiliary verbs, with each verb including one or more attributes;

the step of transforming includes the steps of:
transforming said non-auxiliary verb into one or more instructions to select, from the event table, one or more non-auxiliary verbs having similar meaning with said non-auxiliary verb in the question; and
transforming the grammatical components in the question other than the component that is said non-auxiliary verb into one or more instructions for at least identifying data in the selected attributes.

8. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules; and transforming, by the system, at least one component into one or more instructions, using one or more semantic rules and the database, for generating the answer to the natural-language question;

wherein
the step of analyzing includes the steps of:
scanning the question to extract each word in the question; and
parsing the question by applying the grammatical rules and the database on each of the extracted word to identify its grammatical meaning and to match the question with the pre-defined grammatical structure;

one grammatical component is an interrogative pronoun;

the database includes one or more topic-related tables; each table includes one or more attributes;

the grammatical components in the question other than the component that is the interrogative pronoun have selected one or more tables;

the step of transforming includes the step of transforming the pronoun into one or more instructions for at least identifying one or more attributes in the one or more selected tables.

9. A database-processing method as recited in claim 1, wherein the database includes one or more topic-related tables;

each table has a plurality of data;

one grammatical component is an adjective;

at least one of the grammatical components in the question other than the component that is the adjective has selected one or more tables; and the step of transforming includes the step of transforming the adjective into one or more instructions to at least identify data in the one or more selected tables.

10. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules; and transforming, by the system, at least one component into one or more instructions, using one or more semantic rules and the database, for generating the answer to the natural-language question;

wherein
the step of analyzing includes the steps of:
scanning the question to extract each word in the question; and
parsing the question by applying the grammatical rules and the database on each of the extracted word to identify its grammatical meaning and to match the question with the pre-defined grammatical structure; and the database includes one or more tables;

each table includes one or more attributes;

each attribute identifies a plurality of data;

one grammatical component is an adjective;

the adjective is mapped to an algorithm;

at least one of the grammatical components in the question other than the component that is the adjective has selected one or more tables; and the step of transforming includes the steps of identifying one or more attributes in the one or more selected tables for the algorithm to operate on the data in those attributes.

11. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules; and transforming, by the system, at least one component into one or more instructions, using one or more semantic rules and the database, for generating the answer to the natural-language question;

wherein
the step of analyzing includes the steps of:
scanning the question to extract each word in the question; and
parsing the question by applying the grammatical rules and the database on each of the extracted word to identify its grammatical meaning and to match the question with the pre-defined grammatical structure; and the database includes one or more tables;

each table includes a plurality of data;

one grammatical component is a preposition;

the preposition is mapped to an algorithm; and at least one of the grammatical components in the question other than the component that is the preposition has selected one or more tables for the algorithm to operate on the data in those tables.

12. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules; and transforming, by the system, at least one component into one or more instructions, using one or more semantic rules and the database, for generating the answer to the natural-language question;

wherein
the step of analyzing includes the steps of:
scanning the question to extract each word in the question; and
parsing the question by applying the grammatical rules and the database on each of the extracted word to identify its grammatical meaning and to match the question with the pre-defined grammatical structure; and one grammatical component is a preposition; and the step of transforming includes the step of determining by the preposition a grammatical component being processed before another grammatical component.

13. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules; and transforming, by the system, at least one component into one or more instructions, using one or more semantic rules and the database, for generating the answer to the natural-language question;

wherein
the step of analyzing includes the steps of:
scanning the question to extract each word in the question; and
parsing the question by applying the grammatical rules and the database on each of the extracted word to identify its grammatical meaning and to match the question with the pre-defined grammatical structure; and an extracted word in the question has more than one grammatical meaning; and the method further comprises the step of producing an answer for each meaning if there is one.

14. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules; and transforming, by the system, at least one component into one or more instructions, using one or more semantic rules and the database, for generating the answer to the natural-language question;

wherein
the step of analyzing includes the steps of:
scanning the question to extract each word in the question; and
parsing the question by applying the grammatical rules and the database on each of the extracted word to identify its grammatical meaning and to match the question with the pre-defined grammatical structure; and a word in the question is not in the database; and the method further comprises the step of removing the word from the question to generate an answer for the remaining words in the question.

15. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules; and transforming, by the system, at least one component into one or more instructions, using one or more semantic rules and the database, for generating the answer to the natural-language question;

wherein the step of analyzing includes the steps of:

scanning the question to extract each word in the question; and parsing the question by applying the grammatical rules and the database on each of the extracted word to identify its grammatical meaning and to match the question with the pre-defined grammatical structure; and the pre-defined grammatical structure includes a non-essential grammatical component; and if the grammatical components of the question do not include the non-essential grammatical component, the method further comprises the step of ignoring the non-essential grammatical component in generating the answer.

16. A database-processing method as recited in claim 1, wherein the analyzing step further comprises the step of suggesting the user to re-enter the question based on the pre-defined structure, if the grammatical components of the question is different from the pre-defined structure.

17. A database-processing method of answering a question by a computer system with a database that includes many questions, each with its corresponding answer, the method comprising the steps of:

comparing the question with questions in the database; and if there is a match, retrieving the answer corresponding to the matched question in the databases;

wherein:

said question is a natural-language question;

each question includes more than one grammatical component;

each question includes essential and non-essential grammatical components;

before the step of comparing, the method further comprises the step of extracting the grammatical components from the natural-language question;

the step of comparing includes the steps of:

comparing the grammatical components of the natural-language question with the grammatical components of the questions in the database; and comparing the essential components of the natural-language question with the essential components of the questions in the database.

18. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules;

transforming, by the system, at least one component into one or more instructions, using one or more semantic rules and the database, for generating the answer to the natural-language question;

if the question cannot be parsed into its grammatical components based on the pre-defined structure, then comparing the natural-language question with questions in the database; and if there is a match, retrieving the answer corresponding to the matched question in the database.

19. A database-processing method of answering a natural-language question by a computer system with a database, the method comprising the steps of:

analyzing, by the system, the grammatical structure of the natural-language question for parsing the question into its grammatical components based on a pre-defined context-free grammatical structure, using the database and one or more grammatical rules; and transforming, by the system, at least one component into one or more instructions, using one or more semantic rules and the database, for generating the answer to the natural-language question;

wherein the step of analyzing includes the steps of:

scanning the question to extract each word in the question; and parsing the question by applying the grammatical rules and the database on each of the extracted word to identify its grammatical meaning and to match the question with the pre-defined grammatical structure; and an extracted word in the question has more than one meaning; and the method further comprises the step of producing an answer for each meaning if there is one.

20. A database-processing method as recited in claim 19, wherein after the step of transforming, the method further comprising the step of executing, by the system, the one or more instructions to at least access data from the database for generating the answer to the natural-language question.

21. A database-processing method as recited in claim 19, wherein one grammatical component is a noun;

the database includes one or more topic-related tables, where each table identifies a plurality of data related to a topic; and the step of transforming includes the steps of:

transforming the noun into one or more instructions to select one topic-related table from the database; and transforming the grammatical components in the question other than the component that is the noun into one or more instructions for at least identifying data in the selected table.

22. A database-processing method as recited in claim 19, wherein one grammatical component is a noun; and the step of transforming includes the steps of:

identifying the algorithm corresponding to the noun; and applying the algorithm to data selected by grammatical components in the question other than the component that is the noun.

23. A database-processing method as recited in claim 19, wherein the database includes one or more topic-related tables;

each table has a plurality of data;

one grammatical component is an adjective;

at least one of the grammatical components in the question other than the component that is the adjective has selected one or more tables; and the step of transforming includes the step of transforming the adjective into one or more instructions to at least identify data in the one or more selected tables.

24. A database-processing method as recited in claim 19, wherein the pre-defined grammatical structure includes an interrogative pronoun, followed by an auxiliary verb, which is followed by a noun-phrase.

25. A database-processing method as recited in claim 19, wherein the analyzing step further comprises the step of suggesting the user to re-enter the question based on the pre-defined structure, if the grammatical components of the question is different from the pre-defined structure.

* * * * *